United States Patent [19]

Johnson

[11] Patent Number: 5,062,452
[45] Date of Patent: Nov. 5, 1991

[54] VALVE MEMBER AND METHOD OF MAKING SUCH A MEMBER

[75] Inventor: Jerry E. Johnson, Houston, Tex.

[73] Assignee: Harrisburg, Inc., Houston, Tex.

[21] Appl. No.: 616,669

[22] Filed: Nov. 21, 1990

[51] Int. Cl.$^5$ .............................................. F16K 15/06
[52] U.S. Cl. .............................. 137/533.25; 251/368; 264/255; 137/543.13
[58] Field of Search ......... 137/533.25, 516.25–516.29, 137/543.13; 251/368; 264/255

[56] References Cited

U.S. PATENT DOCUMENTS

| | | | |
|---|---|---|---|
| 664,146 | 12/1900 | Hackett | 137/533.25 |
| 2,233,649 | 3/1941 | Stahl | 137/533.25 X |
| 2,933,284 | 4/1960 | Yocum | 251/368 X |
| 3,331,582 | 7/1967 | Ford | 251/368 X |
| 3,408,038 | 10/1968 | Scaramucci | 251/317 X |
| 3,532,115 | 10/1970 | Hodil | 137/516.25 |
| 4,345,738 | 8/1982 | Ripert | 251/317 X |
| 4,683,910 | 8/1987 | Benson | 251/368 X |

Primary Examiner—Robert G. Nilson
Attorney, Agent, or Firm—Marshall, O'Toole, Gernstein, Murray & Bicknell

[57] ABSTRACT

A valve member comprising a lower support portion and an upper seal portion. The support portion is made of a relatively rigid plastic and the seal portion is made of a relatively soft plastic. The two plastic portions are integrally merged to form a single piece valve member. The valve member may further include an upper support portion which is formed of a relatively rigid plastic and is integrally merged with the seal portion. The method of making the valve member using a mold in the shape of the valve member, comprises pouring the material forming one of the portions into the mold while in a liquid or molten state, and then pouring the material forming another of the portions into the mold in a liquid state onto the first portion. The two portions merge or diffuse along the interface between them and, when cured, form an integral unit. In an embodiment where a third portion is provided, the third portion, while the materials are in lqiuid state, is poured and becomes merged and integrated with the first two portions.

8 Claims, 2 Drawing Sheets

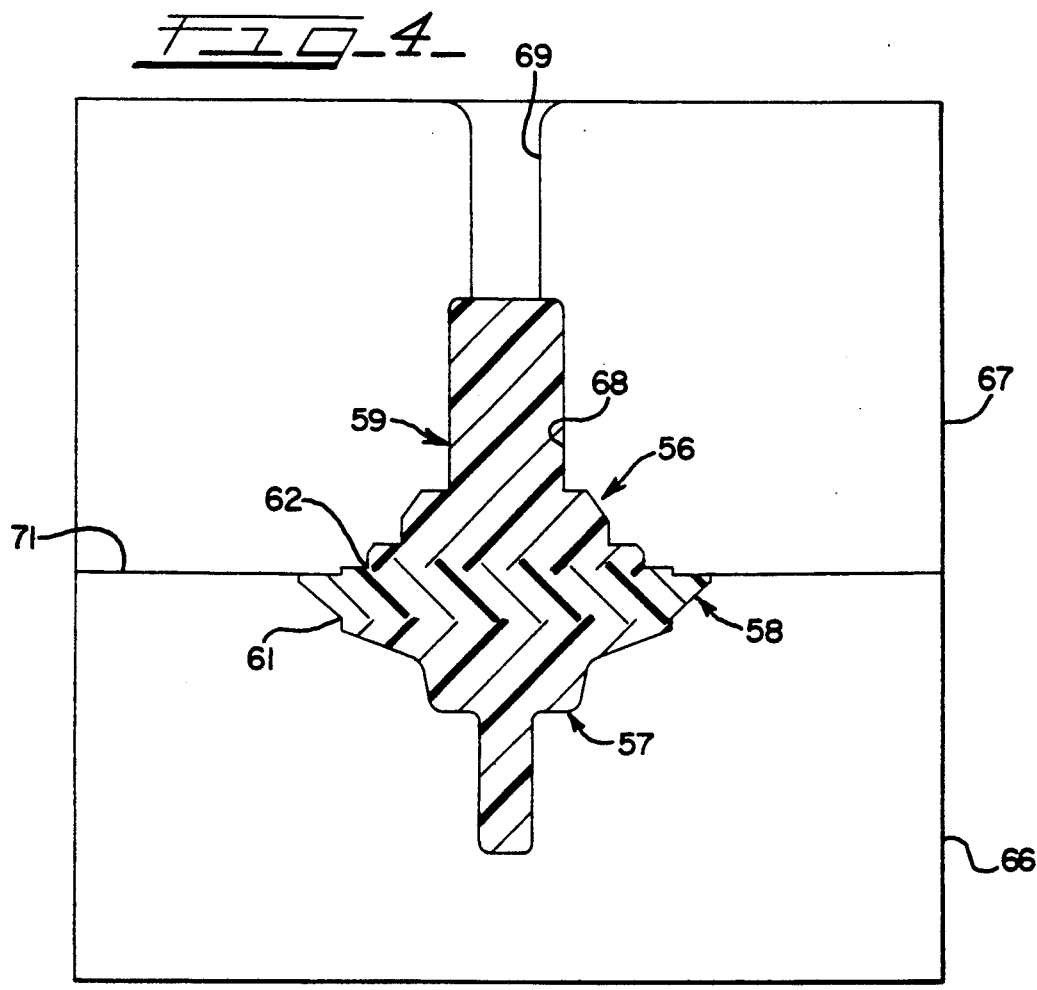
FIG_4_
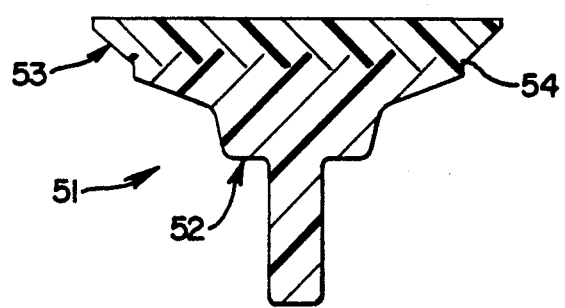
FIG_3_

VALVE MEMBER AND METHOD OF MAKING SUCH A MEMBER

FIELD AND BACKGROUND OF THE INVENTION

This invention relates to valves, and more particularly to a one-way or check valve used, for example, in conjunction with a pump.

Check valves are, of course, widely used in a variety of applications. The type of valve to which this invention pertains finds use, for example, in oil well or water well operations where a liquid (in some applications the liquid carries solids) is flowed through a pipe. The liquid normally flows in one direction and, in response to a differential pressure across the valve, it closes to prevent the flow of liquid in the reverse direction.

Check valves of this nature include a housing forming a flow passage, and an annular valve seat is formed on the wall of the passage. A movable valve member (more commonly referred to simply as the valve) is mounted in the passage and controls the flow through the valve. In prior art constructions, the valve member typically includes a metal valve body and an elastomeric seal which engages the seat to close the valve. Problems with this construction are that the seal is usually stretched when mounting it on the valve body, often causing cracks which eventually lead to failure of the seal, and that solid particles may become lodged between the seal and the body and cause failure. Valves have also been provided where the valve body is made in part of metal and in part of plastic, and the elastomeric seal is mounted on one of the two parts. Further, the U.S. Pat. No. 4,860,995 to Rogers shows a valve body including a metal part and a plastic part wherein the plastic part also functions as the elastomeric seal.

All of the foregoing constructions have the disadvantage that the valve member includes two or more separate parts which are fastened together in some manner. As previously mentioned, such valves have disadvantages, particularly when liquids containing solids flow through the valve.

It is a general object of this invention to provide a novel and improved valve member and method of making such a member, which avoids the foregoing problems.

SUMMARY OF THE INVENTION

A valve member in accordance with this invention comprises a lower support portion and an upper seal portion. The support portion is made of a relatively rigid plastic and the seal portion is made of a relatively soft plastic. The two plastic portions are integrally merged to form a single piece valve member. The valve member may further include an upper support portion which is formed of a relatively rigid plastic and is integrally merged with the seal portion.

The method of making the valve member comprises the steps of forming a mold in the shape of the valve member, pouring the material forming one of the portions into the mold while in a liquid or molten state, and then pouring the material forming another of the portions into the mold onto the first portion. The two portions merge or diffuse along the interface between them and, when cured, form an integral unit. In an embodiment where a third portion is provided, the third portion, while the materials are in liquid state, is poured and becomes merged and integrated with the first two portions.

BRIEF DESCRIPTION OF THE DRAWINGS

The invention will be better understood from the following detailed description taken in conjunction with the figures of the accompanying drawings, wherein:

FIG. 3 is a sectional view of an alternative form of valve member; and

FIG. 4 is a sectional view showing another alternative form of valve member and a method of making the valve member, in accordance with this invention.

DETAILED DESCRIPTION OF THE INVENTION

Figure 1:
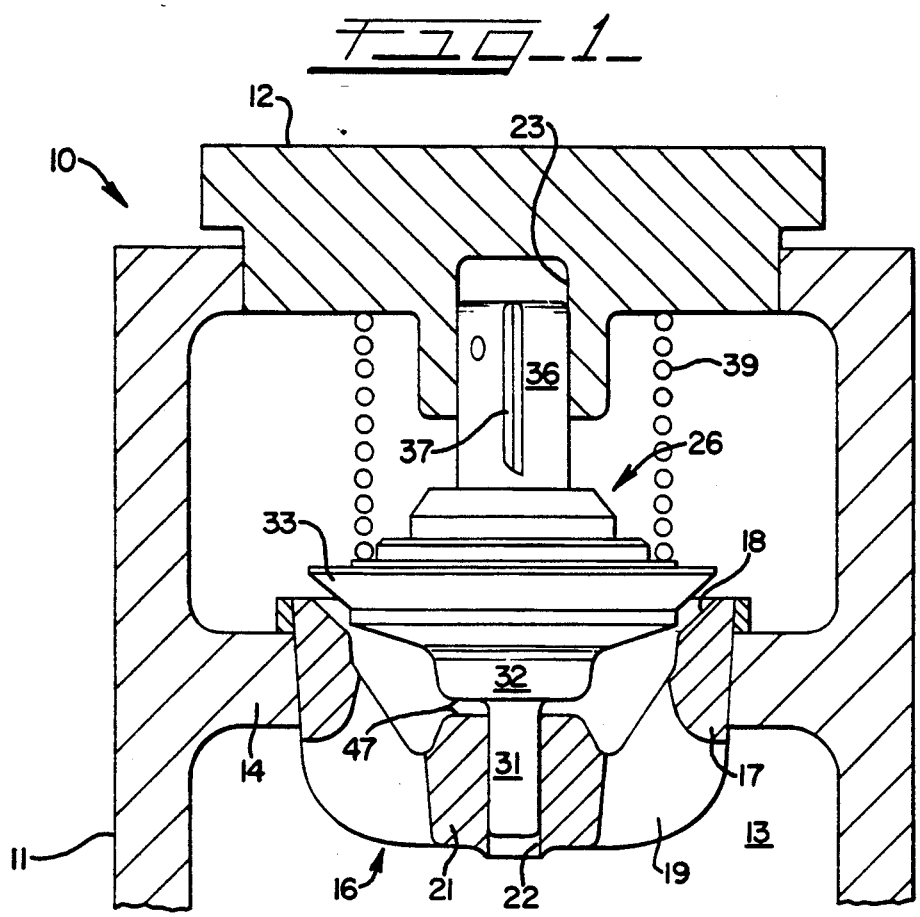
FIG. 1 is a view partially in section showing a valve in accordance with this invention.

With reference to FIG. 1, the valve includes a conventional housing 10 formed by a cylindrical body part 11 and a removable cap 12 which are secured together during use. The body part 11 comprises a tubular outer wall forming a fluid passage 13 therein and a radially inwardly extending ledge 14 which supports a circular seat 16 that also may have a conventional construction. The seat 16 comprises a ring 17 which forms an annular conical seal surface 18. Spaced legs 19 extend downwardly from the ring 17 and support a guide 21 having a lower guide hole 22 formed through it. The underside of the cap 12 has an upper guide hole 23 formed in it.

During use, when the valve is open, a fluid (normally a liquid) flows upwardly from the passage 13, through the open spaces between the legs 19 and past the seat 18, and out of the housing 10 through laterally extending passages (not shown) between the ledge 14 and the cap 12.

The assembly further includes a valve member 26 (more commonly referred to simply as a valve) for closing the flow passage. In the embodiment of the invention shown in FIGS. 1 and 2, the valve member 26 includes a lower portion 27, an upper portion 28, and a seal portion 29 between the two portions 27 and 28.

The lower portion 27 comprises a cylindrical guide shaft or pin 31 which slidingly extends into the guide hole 22 and guides the lower part of the valve member 26 as it reciprocates vertically in the valve housing. The portion 27 further comprises a radially enlarged seal support 32 which has a maximum diameter that is slightly less than the seat 18 diameter.

The seal portion 29 extends upwardly and radially outwardly from the seal support 32. A conical seal surface 33 is included in the portion 29 and shaped to mate with the seat surface 18 of the seat 16.

The upper portion 28 includes a cylindrical guide shaft or pin 36 which extends into the upper guide hole 23 and guides the upper end of the valve member as it moves vertically. The two guide shafts 31 and 36 are coaxial and are aligned with the centerline of the housing part 11 and the seat 16. A slot or groove 37 is formed on the outside of the shaft 36 to allow fluid flow to and from the bottom of the guide hole 23 as the shaft 36 moves in the hole 23. At the lower end of the shaft 36, the upper part 28 has a radially enlarged portion 37 which overlies and supports the seal portion 29. A flat portion 38 forms a seat for a compression spring 39, and a shoulder 41 serves to center the spring 39.

During operation of the valve, the spring 39 biases the valve member 29 downwardly to move the seal surfaces 18 and 33 together and thereby close the passageway 13. When the fluid pressure below the valve member is high enough, it moves the valve member 26 upwardly and opens the passage between the seal surfaces. The valve closes again when the pressure above the valve member plus the spring 39 force overcomes the pressure below the valve.

Figure 2:
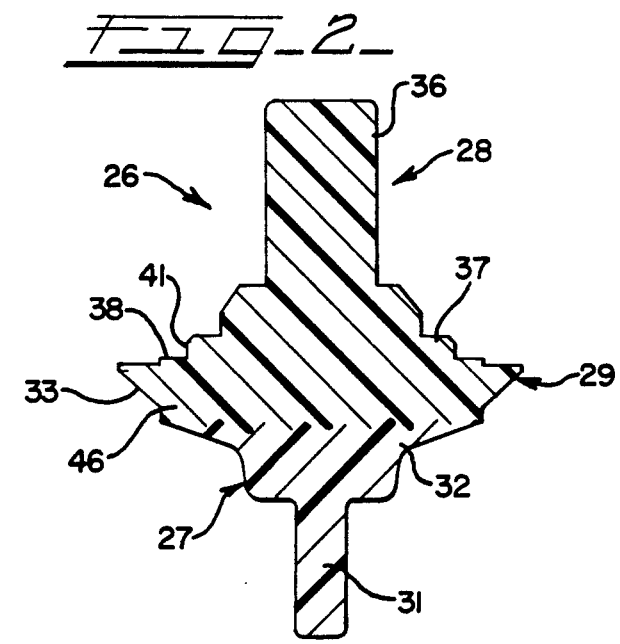
FIG. 2 is a sectional view of a valve member shown in FIG. 1.

With reference to FIG. 2, the valve 26 is made of two integrated plastic portions. One portion forms the lower part 27 and the other plastic portion forms the upper and seal parts 28 and 29. At the juncture or interface 46 between the two parts 27 and 29, the two plastic portions merge or join to form a single unitary valve member. The upper and seal parts 28 and 29 are made of a relatively soft elastomeric material which is conformable with the surface 18 and forms a good seal. The lower part 27 is a relatively rigid plastic which supports the seal part 29 and prevents the pressure above the valve member from extruding the relatively soft plastic portions downwardly through the seal surface 18 when the valve is closed. When closed, the surfaces 47 (FIG. 1) engage and support the lower part 27 which, in turn, supports the parts 28 and 29.

The embodiment of the invention shown in FIG. 3 is similar to that of FIG. 2 except that it does not include an upper part 28. The valve member 51 includes a lower portion 52 and a seal portion 53 made of rigid and soft plastics as described in connection with FIG. 2. The parts 52 and 53 are constructed similarly to the portions 27 and 29 and merge at an interface 54 to form an integral valve member.

In the embodiment of FIG. 4, the valve member 56 includes a lower part 57, a seal part 58 and an upper part 59, made of rigid, soft and rigid plastic materials, respectively. The parts merge at interfaces 61 and 62 and form a unitary valve member. The rigid upper part 59 also acts to support the soft seal part 57.

The parts of the valve member are made of castable plastic materials which are compatible in the sense that they will merge together along an interface while they are in a liquid state. As a specific example, the hard plastic parts may be made of Royal Cast No. 2501 polyurethane sold by Uniroyal Chemical. The soft plastic part may be made of F 242 polyurethane sold by Mobay corporation. Uniroyal Chemical makes a similar castable plastic.

To manufacture a valve member in accordance with this invention, a mold is formed having a mold cavity in the shape of the valve member. With reference to FIG. 4, a split mold formed by a lower half 66 and an upper half 67 is provided, and a mold cavity 68 is formed in the two halves. A pour opening 69 leading to the upper end of the cavity 68 is formed in the upper half 67.

When casting the valve member 56 shown in FIG. 4, the mold halves 66 and 67 are first heated. The castable plastic forming the lower portion 57 is initially a flowable liquid, and it is mixed with a known catalyst suitable for the chosen castable plastic, and then poured into the cavity 68 to the level of the interface 61. The castable plastic forming the soft seal portion 58 is similarly mixed with a catalyst and poured into the mold cavity on top of the part 57, while the lower part 57 is still in its liquid state. The material forming the upper part 59 (which may be the same as the material of the lower part 57) is then poured over the seal part 58 while the seal part is still in its liquid state. The compatible plastics forming the three parts merge along the interfaces 61 and 62, and when the plastic sets or cures, a unitary valve member is formed having parts of different rigidity. The two mold halves may, of course, be separated along a line 71 to remove the valve member.

To make the valve member of FIG. 3, only two pours are required and only the lower mold half 66 may be utilized. In the valve member of FIG. 2, only two pours are needed, the second forming the seal and upper parts.

While a specific example of suitable plastics has been given, it will be apparent that other compatible plastics known to those skilled in this art may be used, which will flow together and merge along an interface to form an integral valve member.

Since the portions of the valve member merge and form an integral member, the seal portion is well supported by the rigid part(s), and the portions cannot separate and enable solid particles to lodge between them.

what is claimed is:

1. A valve member for a one-way check valve including an annular valve seat forming a flow passage, said seat having a central axis, said valve member being movable on said axis relative to said seat, said flow passage having a supply side and a discharge side, said valve member comprising a seal portion an a support portion, said seal portion being made of a relatively soft plastic material and said support portion being made of a relatively rigid plastic material, said soft and rigid plastic materials being compatible and merging along an interface therebetween to form an integral valve member, said seal and support portions extending across said flow passage and said seal portion forming an annular conical seal surface which is engageable with a seal surface of said valve seat, said interface extending closely adjacent said seal surface, said rigid plastic material being on said supply side and said soft plastic material being on said discharge side.

2. A valve member as set forth in claim 1, wherein said support portion comprises upper and lower parts, each of said parts forming an interface with said seal portion.

3. A valve member as set forth in claim 2, wherein said upper part is made of said relatively rigid plastic material.

4. A valve member as set forth in claim 1, wherein said valve seat includes a support on said supply side, and said support portion of said valve member including support means which is engageable with support.

5. Apparatus for a one-way check valve, comprising:
   a) a valve seat including an annular conical seal surface forming a fluid flow passage therethrough, said seal surface having a supply side and a discharge side and fluid flowing from said supply side to said discharge side, said valve seat further including a support attached to said seal surface on said supply side thereof;
   b) a valve member comprising a seal portion made of a relatively soft plastic material and a support portion made of a relatively rigid plastic material, said soft and rigid plastic materials being compatible and merging along an interface therebetween to form an integral valve member, said seal portion forming an annular conical seal surface which is engageable with said seal surface of said valve seat, said valve seat having a central axis and said valve member being movable on said axis to move said seal surfaces into and out of engagement, said seal and support portions extending across said fluid flow passage and closing said passage when said seal surfaces are in engagement, said support portion being on said supply side of said seal portion and said interface extending adjacent said seal surface of said seal portion, and said support portion engaging and being supported by said support of said valve seat when said seal surfaces are in engagement.

6. Apparatus as set forth in claim 5, wherein said support includes a guide hole on said axis, and said support portion includes a guide shaft which is slidable in said guide hole.

7. Apparatus as set forth in claim 5, wherein said valve seat further includes an annular axial surface which is parallel with said axis and is adjacent said conical seal surface on said supply side thereof, and said interface is adjacent and has substantially the same diameter as said axial surface.

8. Apparatus as set forth in claim 5, and further including a second support portion made of relatively rigid plastic material and secured to said seal portion on the discharge side of said seal portion said second support portion being spaced from said conical seal surface of said valve member and thereby allowing said seal portion to flex.

* * * * *